United States Patent Office 2,972,595
Patented Feb. 21, 1961

2,972,595

DIALKYL TIN EPOXY-SUCCINATE STABILIZERS FOR POLYMERS OF POLYVINYL CHLORIDE

Abraham Bavley, Brooklyn, and Charles J. Knuth, Flushing, N.Y., assignors to Chas. Pfizer & Co., Inc., Brooklyn, N.Y., a corporation of Delaware No Drawing. Filed Dec. 17, 1957, Ser. No. 703,278

9 Claims. (Cl. 260—45.75)

This invention is concerned with new and useful compounds and compositions containing them. More particularly, it relates to new and useful derivatives of epoxysuccinic acid and plastic compositions containing them.

The new and useful compounds of this invention may be represented by the following formula:

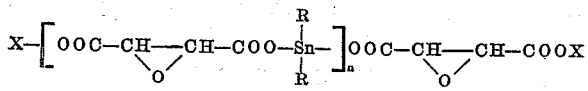

wherein X=hydrogen or alkali metal, R=alkyl containing from 1 to 12 carbon atoms and "$n$" is an integer.

The new and useful compound of this invention in which "X" is alkali metal may be obtained by reacting a dialkyl tin dihalide with an alkali metal salt of epoxysuccinic acid. The dialkyl tin dihalides are those in which each alkyl group contains from 1 to 12 carbon atoms. Alternatively, the new compounds in which "X" is hydrogen may be prepared by reacting a dialkyl tin oxide or hydroxide with epoxysuccinic acid.

Vinyl halide polymers such as the commercially important polyvinyl chloride and its copolymers are markedly subject to degradation when exposed to heat and light. The degradation is evidenced by considerable discoloration which may also be accompanied by the development of brittleness and loss of strength. This degradation is more particularly noted in product fabrication processes wherein elevated temperatures, for example, from about 130° C. and higher are employed for prolonged periods of time. Further, the finished product in service may be subject to heat and light degradation. In the fabrication of products made from polyvinyl chloride polymers, waste scraps are salvaged and re-utilized. Frequently, unless stablized, these waste scraps undergo further degradation in reprocessing. There is then in the art a need for a stabilizer which imparts both heat and light stability.

In this invention the term, vinyl halide polymers, encompasses polymerized vinyl halides and copolymers thereof, such as vinyl chloride copolymers with vinyl esters, acrylic compounds or vinylidene chloride, such copolymers being well known in the art. The preferred vinyl halide polymers include those containing at least 50% by weight of vinyl chloride.

In general, vinyl halide polymer stabilizers are limited in application. They usually serve either as heat stabilizers or light stabilizers but rarely are possessed of significant heat and light stabilizing properties at the same time. For example, cadmium and zinc soaps and certain tin organic compounds effect good light stability but only slight heat stability. At times the toxicity of a stabilizer, as in the case of lead compounds, limits its use. In particular, certain organo-metallic tin derivatives of carboxylic acids have severe limitations in applications involving high temperatures. Organo-metallic tin derivatives of dibasic unsaturated acids, for example, maleic acid, are heat stabilizers but also suffer from limitations. They are polymers which, because of their sticky, resinous nature, are difficult to disperse in a plastic premix. They are also found to be somewhat incompatible with vinyl halide polymers producing cloudy formulations. In addition, the low polymers are volatile and cause dangerous noxious fumes during fabrication processes.

It has now been unexpectedly found that dialkyl tin epoxysuccinates in which each alkyl group contains from 1 to 12 carbon atoms are excellent stabilizers for plastics containing vinyl halide polymers. These stabilizers impart excellent heat and light stability and at the same time are not subject to the limitations described above. They are found to be compatible with vinyl halide polymers, are readily dispersed in plastic premixes and do not form noxious fumes during plastic fabrication of products. They are found to impart excellent heat stability under severe conditions of temperature for long periods of time and, in addition, impart excellent light stability. Such stabilizers are a definite improvement over corresponding prior art organo-metallic tin carboxylic acid derivatives in that they impart greater heat and light stability to vinyl halide plastic compositions.

The compositions of the present invention may be produced by mixing the above mentioned compounds with powdered polymers for fabrication into the desired product form. For example, in preparing flexible plastic sheets from polyvinyl chloride or vinyl chloride-vinyl acetate copolymers the dialkyl tin epoxysuccinate is added to the finely powdered resins in percentages ranging from 0.5% to 5% by weight of the vinyl chloride polymer. As is the procedure commonly employed in the art, a suitable plasticizer, for example, dioctyl phthalate, tricresyl phosphate, dioctyl adipate and others, may be added. The thoroughly blended mixtures are then charged to a two roll mill and heated at a temperature from about 130° to 160° C. This process is commonly employed and familiar to those in the art. The mixtures are thoroughly fluxed and mixed until a uniform sheet is obtained. The stability of the resultant flexible sheets is measured using standard accelerated test procedures well known to those in the art. For instance, a typical accelerated test for light stability is exposure of a specimen to ultraviolet light as in the Atlas Fadeometer for specific time intervals. The specimens are examined for evidence of breakdown, for example, the development of discoloration and brittleness in the flexible sheets of the specimen. A second accelerated test involves evaluating the heat stability of the plastic sheet specimen. For this purpose, samples of the specimens are placed in an oven at elevated temperatures ranging from 150° to 180° C. Samples are removed at hourly intervals for a total of about 8 hours and inspected for discoloration or other evidence of degradation.

It is noteworthy that in milling the stabilized plastic compositions, no appreciable discoloration is noted in the flexible sheet when prolonged periods of time are employed. Further, when reprocessing salvaged pieces of flexible sheets, no discoloration is noted.

In the above mentioned accelerated tests it has been unexpectedly found that the compounds of this invention considerably retard degradation of the flexible plastic sheets by heat and light. The compounds of this invention impart almost perfect heat stabilization for periods of at least 6 hours at a temperature of 160° C. The test specimens remained almost colorless and transparent after such treatment. Generally, further heat stabilizing effect is noted at successively longer time intervals although some discoloration takes place. In comparison, a control plastic composition containing no stabilizer turned dark brown in a matter of minutes at this elevated temperature. A specimen of a plastic composition containing dibutyl tin succinate as the stabilizer turned lemon-yellow after only 15 minutes at this temperature. In the light stability test, the plastic compositions containing the compounds of this invention show remarkable stability, the compositions of the present invention remaining colorless after over 500 hours exposure. The control composition was discolored in the first 20 hours.

The preferred percentages of the stabilizers of this invention to be used for heat and light stabilization of vinyl halide polymers ranges from about 0.5% to about 5% by weight of the plastic composition. Larger quantities of the stabilizer may be used but provide no appreciable advantage. Lesser amounts of the stabilizer, for example, 0.1% by weight, will impart slight improved stability. The stabilizers are found to be readily dispersible in plastic compositions and may be added before or during the milling process with comparable efficiency.

The compounds of the present invention may be prepared from epoxysuccinic acid or its alkali metal salts, for example, the sodium, potassium, or lithium salt, as mentioned above, by procedures familiar to those in the art. For example, the selected dialkyl tin dichloride is added to a mixture of an alkali metal salt of epoxysuccinic acid and a lower alkanol, for example, methanol, ethanol, propanol and others. The reaction is almost instantaneous. The mixture is usually heated at the reflux temperature of the solvent for from ½ to 2 hours. After cooling, the reaction mixture is filtered and the filtrate evaporated under reduced pressure. The residue is then dissolved in benzene and washed thoroughly with water. After separation, the benzene solution is evaporated to obtain the desired product. When epoxysuccinic acid is employed, it is reacted with a selected dialkyl tin oxide or hydroxide in a suitable solvent, for example, benzene, toluene or xylene. The reaction is usually effected at the reflux temperature of the solvent until the calculated amount of water is obtained, the water formed being removed as an azeotropic distillate with the solvent. The product is obtained by filtering the reaction mixture and evaporating the filtrate at reduced pressure.

The product obtained depends on the ratio of the dialkyl tin compound to epoxysuccinic acid. As is well known in the polymer art the ratio of monomers determines the nature of the product. For example, when a 2:1 molar ratio of epoxysuccinic acid to dialkyl tin compound is reacted the product obtained consists mainly of the following:

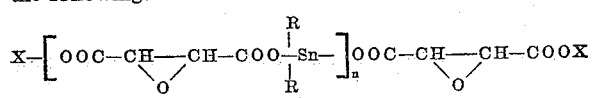

wherein $n=1$. When a 3:2 molar ratio of reactants is employed, the product consists mainly of the above formula wherein $n=2$. For varied values of "$n$" up to infinity, varied ratios of reactants up to a ratio of 1:1 may be employed. Of course, mixtures of products are usually obtained and the value of "$n$" is representative of the major product obtained. The preferred stabilizers are those in which the value of "$n$" ranges from 1 to about 20 since these are usually found to be compatible with vinyl halide polymers and do not produce cloudy formulations.

The following examples are given by way of illustration and are not to be construed as limitations of this invention many variations of which are possible within the scope and spirit thereof.

EXAMPLE I

The dialkyl tin epoxysuccinate condensation products are prepared according to the following procedure. To a mixture of potassium epoxysuccinate in dry ethanol was added with stirring a solution of the selected dialkyl tin dichloride. The mixture was then heated at reflux and stirring continued for ½ hour. The cooled reaction mixture was then filtered. The filtrate was evaporated at reduced pressure to obtain the solid product. In some cases, the product was taken up in benzene and water washed to further purify. The benzene solution, after separation, was evaporated under reduced pressure to obtain the desired product.

The stabilizers mentioned in the following examples were prepared by this procedure. The results are summarized in Table I.

*Table I*

| Molar ratio of epoxysuccinate to dialkyl tin compound | Dialkyl tin dichloride | Average value of $n$ |
|---|---|---|
| 2:1 | dibutyl | 1 |
| 3:2 | bis-dodecyl | 2 |
| 1.2:1 | bis-decyl | 5 |
| 1.1:1 | dimethyl | 10 |
| 2.1:2 | diethyl | 20 |
| 3:2 | dibutyl | 2 |

EXAMPLE II

The procedure of Example I was repeated employing sodium epoxysuccinate and the selected dialkyl tin dibromide with equivalent results.

EXAMPLE III

Dialkyl tin epoxysuccinates were prepared by adding the dialkyl tin hydroxide of choice to a mixture of epoxysuccinic acid in benzene. The mixture was then refluxed until the calculated amount of water was obtained by removal of water-benzene azeotrope. The reaction mixture was filtered and the filtrate evaporated to dryness to obtain the product. Dibutyl, bis-dodecyl-, bis-decyl-, dimethyl- and diethyl tin epoxysuccinate were prepared in this manner employing the same molar ratios as in Example I.

EXAMPLE IV

A plastic formulation was prepared by admixing 60 parts of a vinyl chloride polymer, such as a vinyl chloride (95%)-vinyl acetate (5%) copolymer and 30 parts of plasticizer (in this example, dioctyl phthalate), and 0.5 part of a lubricant (stearic acid). To this formulation, 0.5 part of dibutyl tin epoxysuccinate as prepared in Example I was added. This mixture was thoroughly blended by hand mixing and charged to a two roll mill, heated to a surface temperature of about 130° C. The mixture was thoroughly fluxed and mixed for about 5 minutes and removed from the mill in the form of a uniform flexible sheet of 0.025 inch thickness. Test specimens of the flexible sheet were then subjected to heat stability test in the presence of air by placing in an oven maintained at 160° C. Specimens were removed periodically and examined for discoloration. No appreciable discoloration was noted in the test specimens until after 6 hours.

Test specimens of the flexible sheet were also subject to light stability test in the Atlas Fadeometer for 20 hour periods. Specimens containing no stabilizer were dark-brown at the end of the first 20 hour period while specimens containing the stabilizer mentioned above did not discolor even after 500 hours of exposure.

EXAMPLE V

The procedure of Example IV was followed employing 4.5 parts of dibutyl tin epoxysuccinate as prepared in Example I. In the heat stability tests the samples remained almost colorless after seven hours at 160° C. In the Atlas Fadeometer, discoloration was not noted even after 500 hours of exposure.

EXAMPLE VI

The process of Example IV was repeated employing polyvinyl chloride with comparable results.

EXAMPLE VII

The process of Examples IV, V and VI was repeated with dimethyl tin epoxysuccinate, bis-dodecyl tin epoxysuccinate, diethyl tin epoxysuccinate, bis-decyl tin epoxysuccinate as prepared by the procedures of Examples I, II and III. Comparable heat and light stability was observed in the plastic compositions containing these stabilizers.

What is claimed is:

1. A compound represented by the formula:

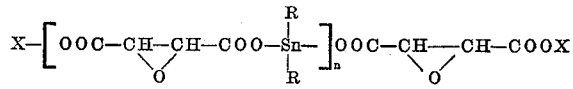

wherein X is selected from the group consisting of hydrogen and alkali metal, R is alkyl containing from 1 to 12 carbon atoms and $n$ is an integer of from 1 to about 20.

2. A compound as claimed in claim 1 wherein X is potassium.

3. A compound as claimed in claim 1 wherein X is sodium.

4. A heat and light stabilized plastic composition which comprises a polymer of vinyl chloride and from about 0.5% to about 5% by weight, based on the weight of the composition, of the compound as claimed in claim 1.

5. A heat and light stabilized plastic composition as claimed in claim 4 wherein the polymer is polyvinyl chloride.

6. A heat and light stabilized plastic composition as claimed in claim 4 wherein the polymer is a vinyl chloride-vinyl acetate copolymer.

7. A compound of claim 1 wherein R is butyl.

8. A compound of claim 1 wherein R is dodecyl.

9. A compound of claim 1 wherein R is ethyl.

References Cited in the file of this patent

UNITED STATES PATENTS

| | | |
|---|---|---|
| 2,166,604 | Meyer | July 18, 1939 |
| 2,307,157 | Quattlebaum et al. | Jan. 5, 1943 |
| 2,671,064 | Cowell et al. | Mar. 2, 1954 |
| 2,684,353 | Greenspan et al. | July 20, 1954 |
| 2,810,733 | Greenspan | Oct. 22, 1957 |
| 2,867,642 | Ramsden et al. | Jan. 6, 1959 |